(12) United States Patent
Yuan

(10) Patent No.: US 10,000,130 B2
(45) Date of Patent: Jun. 19, 2018

(54) CHARGING MANAGEMENT SYSTEM AND METHOD FOR CHARGER OF ELECTRIC VEHICLE

(71) Applicant: Xi'an TGOOD Intelligent Charging Technology Co., Ltd., Xi'an, Shaanxi (CN)

(72) Inventor: Qingmin Yuan, Shaanxi (CN)

(73) Assignee: Xi'an TGOOD Intelligent Charging Technology Co., Ltd., Xi'an, Shaanxi Province (CN)

( * ) Notice: Subject to any disclaimer, the term of this patent is extended or adjusted under 35 U.S.C. 154(b) by 0 days. days.

(21) Appl. No.: 15/144,816

(22) Filed: May 3, 2016

(65) Prior Publication Data

US 2016/0243956 A1 Aug. 25, 2016

(30) Foreign Application Priority Data

Oct. 20, 2015 (CN) .......................... 2015 1 0684035

(51) Int. Cl.
*H02J 7/00* (2006.01)
*B60L 11/18* (2006.01)
(Continued)

(52) U.S. Cl.
CPC ......... *B60L 11/1816* (2013.01); *B60L 3/0046* (2013.01); *B60L 3/0092* (2013.01); *B60L 3/04* (2013.01); *B60L 3/12* (2013.01); *B60L 11/185* (2013.01); *B60L 11/1846* (2013.01); *B60L 11/1857* (2013.01); *B60L 2210/30* (2013.01); *B60L 2230/16* (2013.01); *B60L 2240/545* (2013.01); *B60L 2240/547* (2013.01); *B60L 2240/549* (2013.01); *B60L 2240/70* (2013.01); *B60L 2240/80* (2013.01); *B60L 2250/10* (2013.01); *Y02T 10/7005* (2013.01);
(Continued)

(58) Field of Classification Search
CPC ....................................................... Y02T 90/14
USPC .......................................................... 320/109
See application file for complete search history.

(56) References Cited

U.S. PATENT DOCUMENTS 8,050,815 B2 * 11/2011 Perry .................. B60R 25/2018
340/425.5
8,829,850 B2 * 9/2014 Chiang ................. B60L 3/0069
320/109
(Continued)

*Primary Examiner* — Yalkew Fantu

(57) ABSTRACT

A charging management system (CMS) and a charging management method for a charger of an electric vehicle are provided. The CMS includes a charger grid micro-dispatching system (CGMS) module, a charger battery management system (CBMS) module, a charger vehicle-dispatching management system (CVMS) module, a charger network management system (CNMS) module, and a charger charging management system (CCMS) module. An intelligent safety redundant strategy and a fault recording strategy are introduced, and multiple related parameters of a battery management system (BMS) are built in the CBMS module, so as to realize an intelligent active protection during charging the electric vehicle. Meanwhile, through analyzing the BMS and characteristic data of a power battery, cooperating with the CCMS module, adopting a multi-dimension data analyzing and controlling strategy, and outputting an optimized flexible curve current based on battery charging, life time of the battery is lengthened.

10 Claims, 3 Drawing Sheets

(51) Int. Cl.
*B60L 3/00* (2006.01)
*B60L 3/04* (2006.01)
*B60L 3/12* (2006.01)

(52) U.S. Cl.
CPC .......... *Y02T 10/705* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2005/0035741 A1* | 2/2005 | Elder | B60L 3/0046 320/116 |
| 2009/0304101 A1* | 12/2009 | LoPorto | G01D 4/004 375/260 |
| 2012/0166004 A1* | 6/2012 | Park | G06Q 50/06 700/291 |
| 2014/0028255 A1* | 1/2014 | Brimacombe | B60L 11/1824 320/109 |

* cited by examiner

CHARGING MANAGEMENT SYSTEM AND METHOD FOR CHARGER OF ELECTRIC VEHICLE

CROSS REFERENCE OF RELATED APPLICATION

The present application claims priority under 35 U.S.C. 119(a-d) to CN 201510684035.6, filed Oct. 20, 2015.

BACKGROUND OF THE PRESENT INVENTION

Field of Invention

The present invention relates to a technical field of electric vehicle charging, and more particularly to charging management system and method for a charger of an electric vehicle.

Description of Related Arts

With the social progress and the increase of the environmental awareness, the electric vehicle with the power of the vehicle-mounted power supply is able to solve the problems of the environmental pollution caused by the exhaust emission of the fuel vehicle and the high energy consumption, and thus becomes more and more popular. In china, various measures are implemented, such as establishing the industrial innovation system, perfecting the industrial policy, and promoting the pilot demonstration, so as to greatly accelerate the development of the electric vehicle. Conventionally, in China, the electric vehicle technology is basically mature; the industrial chain is relatively complete; the electric bus, the electric sanitation vehicle, the electric taxi and et al. have played certain demonstration roles in local areas for specific purposes.

However, charging of the electric vehicle is the problem which people are highly concerned about, and relevant to the popularization and the promotion of the electric vehicle. The conventional charging modes of the conventional charger are divided into direct current (DC) charging and alternating current (AC) charging. The AC charging has the small output power, and needs relatively long charging time to fully charge the power battery of the electric vehicle. However, the DC charging is different. Because of the relatively large output power, the DC charging is able to fully charge the power battery in a short time, which greatly reduces the charging waiting time of the user.

The conventional charger has the following disadvantages.

1. Non-Intelligent Charger

The charging mode is fixed and single, and the charging strategies are few, which fails to meet the requirements of the user; because of lacking the dispatching of the micro-grid, the charging power merely considers the requirements of the battery management system (BMS), and charges the battery with the maximum capacity all the time, which greatly impacts the grid; and meanwhile, the related technology of user vehicle dispatching is lacking.

2. If the charger charges the electric vehicle completely according to the requirements of the BMS of the electric vehicle, various unexpected conditions during charging are inevitable. For example, when the BMS crashes, the continuous charging of the charger causes over charging and serious consequences.

3. If the charger charges the electric vehicle completely according to the requirements of the BMS, under the DC charging, the battery life decreases fast. Under the current technology, the frequent use of the DC charging increases the damage to the battery and shortens the battery life.

SUMMARY OF THE PRESENT INVENTION

An object of the present invention is to provide a charging management system (CMS) and a charging management method for a charger of an electric vehicle, so as to solve problems of a non-intelligent charger, a fixed and single charging mode, and few charging strategies of the conventional charger.

In order to accomplish the above object, the present invention adopts following technical solutions.

A CMS for a charger of an electric vehicle comprises:

a charger grid micro-dispatching system (CGMS) module, which is responsible for communicating with a power supply grid centralized controller, interpreting received parameter information data according to a certain strategy, outputting an interpretation result, and sending the interpretation result to a charger charging management system (CCMS) module;

a charger battery management system (CBMS) module, which is responsible for communicating with a battery management system (BMS) of the electric vehicle, receiving various communication and charging parameters sent by the BMS, interpreting the various communication and charging parameters according to a certain strategy, outputting charging requirement parameters and sending the charging requirement parameters to the CCMS module;

a charger vehicle-dispatching management system (CVMS) module, which is responsible for communicating with the CCMS module and collecting multiple built-in parameters of the charger, and meanwhile responsible for communicating with a user vehicle dispatching center and sending the multiple built-in parameters of the charger to the user vehicle dispatching center;

a charger network management system (CNMS) module, which is responsible for communicating with an intelligent network cloud platform, receiving and sending multiple parameter information, and meanwhile indirectly communicating with a user terminal device through the cloud platform; and the CCMS module, which is a core of the CMS, responsible for communicating with the CGMS module, the CBMS module, the CVMS module and the CNMS module, and meanwhile responsible for a control of a direct current (DC) module, a control of a vehicle power distribution unit (PDU), battery diagnosis and protection, charger self-diagnosis and self-protection, BMS diagnosis and protection, vehicle diagnosis and protection, and fault recording.

A charging management method for the charger of the electric vehicle comprises steps of:

before charging, the power supply grid centralized controller monitoring grid usage conditions of a controlled area and sending area electric quantity load information to the CMS; the CGMS module receiving the area electric quantity load information, judging whether a current area electric quantity is over a preset area electric quantity upper limit, and sending the current area electric quantity and a judged result to the CCMS module;

the CCMS module receiving charging mode information and starting to charge the electric vehicle; and after finishing charging, the CCMS module sending a charging electric quantity to the CGMS module; the CGMS module collecting the charging electric quantity of the charger in a specific time period and sending to the power supply grid centralized controller.

Preferably, during charging, the CVMS module sends current charger information, a condition whether an area electricity consumption is over load parameters, and estimated charging information to the user vehicle dispatching center; and, according to the above information, the user vehicle dispatching center determines an affiliated unit of the electric vehicle to choose chargers at different locations for charging the electric vehicle.

Preferably, when the electric vehicle of a user is connected with a charging gun, the user sends a charging request through the user terminal device, and a background of the cloud platform judges the charging request; when charging is feasible, the cloud platform sends a charging starting instruction to the CNMS module; after receiving the charging starting instruction, the CNMS module sends the charging starting instruction to the CCMS module, so as to finish the charging request; the CCMS module sends the current charger information, the condition whether the area electricity consumption is over the load parameters, and the estimated charging information to the user terminal device through the CNMS module.

Preferably, the current charger information comprises a charger location, a charger type, a charger idle condition, a charging power, and a charging waiting time; the estimated charging information comprises an estimated charging time and an estimated charging expense.

Preferably, during charging, the BMS sends real-time parameter values, such as a battery cell maximum voltage, a cell current, and a cell maximum temperature, to the CBMS module; according to multiple built-in parameter thresholds, the CBMS module adjusts an algorithm, and sends parameter values of an optimal charging strategy to the CCMS module; the CCMS module judges the parameter values and adjusts an output power.

Preferably, the power supply grid centralized controller monitors the grid usage conditions of the controlled area; wherein:

(1) when the received area electric quantity is Mkw, larger than 120% of the preset upper limit of Nkw, the CGMS module determines not to charge the electric vehicle in a specific time period, and meanwhile sends the charging mode information to the CCMS module;

(2) when the received area electric quantity is Lkw, larger than the preset upper limit of Nkw, but smaller than 120% of the preset upper limit of Nkw, the CGMS module determines to continue charging the electric vehicle, but decreases the charging power required by the BMS to 90%, and meanwhile sends the charging mode information to the CCMS module; and (3) when the received area electric quantity is Pkw, smaller than the preset upper limit of Nkw, the CGMS module determines to continue charging the electric vehicle with 100% of the charging power according to requirements of the BMS, and meanwhile sends the charging mode information to the CCMS module.

Preferably, an intelligent charging strategy is adjusted according to following parameters: area grid load parameters sent by the CGMS module; required charging voltage and current of the charger, sent by the CBMS module; multiple parameters of the cloud platform and related parameters of user charging requirements, sent by the CLAMS module. Multiple parameter values, which are built in the charger, comprise a preset voltage-time flexible charging curve. During charging, according to collected real-time voltage information, the CCMS module adjusts an output; and meanwhile, according to the different charging requirements of the multiple users in the same charging station, the CCMS module appropriately adjusts the output power.

Preferably, an active protection strategy is adjusted according to following parameters: a total voltage, a cell voltage, a cell maximum voltage, and a cell maximum temperature sent by the CBMS module during charging. Meanwhile, based on built-in warning parameter values in the charger, the above parameters are set not to over a specific value; when the above parameters is over the specific value, the CCMS module warns, and even stops charging.

The present invention has following beneficial effects.

Firstly, a first part of the charger, which is for communicating with the BMS, is integrated into a CBMS which is a sub-system of the CMS; and meanwhile the CBMS is modularized, for facilitating a future extension. Meanwhile, an intelligent safety redundant strategy and a fault recording strategy are introduced, and multiple related parameters of the BMS are built in the CBMS module, so as to realize an intelligent active protection during charging the electric vehicle. Meanwhile, through analyzing the BMS and characteristic data of the power battery, cooperating with the CCMS module, adopting a multi-dimension data analyzing and controlling strategy, and outputting an optimized flexible curve current based on battery charging, life time of the battery is lengthened.

Secondly, a second part of the charger, which is for implementing functions of the charger, is integrated into a CCMS which is a sub-system of the CMS, and the CCMS is modularized. A flexible charging intelligent strategy is added into the CCMS module.

Thirdly, a third part of the charger, which is for communication with the user vehicle dispatching center, is integrated in to a CVMS which is a sub-system of the CMS, and the CVMS is modularized, for facilitating the future extension. Meanwhile, the intelligent user vehicle dispatching strategy is introduced, so as to meet user vehicle dispatching requirements.

Fourthly, a fourth part of the charger, which is for communicating with the power supply grid centralized controller, is integrated into a CGMS which is a sub-system of the CMS, and the CGMS is modularized, for facilitating the future extension.

Fifthly, a fifth part of the charger, which is for communicating with the intelligent network cloud platform, is integrated into a CNMS which is a sub-system of the CMS, and meanwhile the CNMS is modularized, for facilitating the future extension.

These and other objectives, features, and advantages of the present invention will become apparent from the following detailed description, the accompanying drawings, and the appended claims.

DETAILED DESCRIPTION OF THE PREFERRED EMBODIMENT

The present invention is further illustrated with accompanying drawings and a preferred embodiment.

Figure 1:
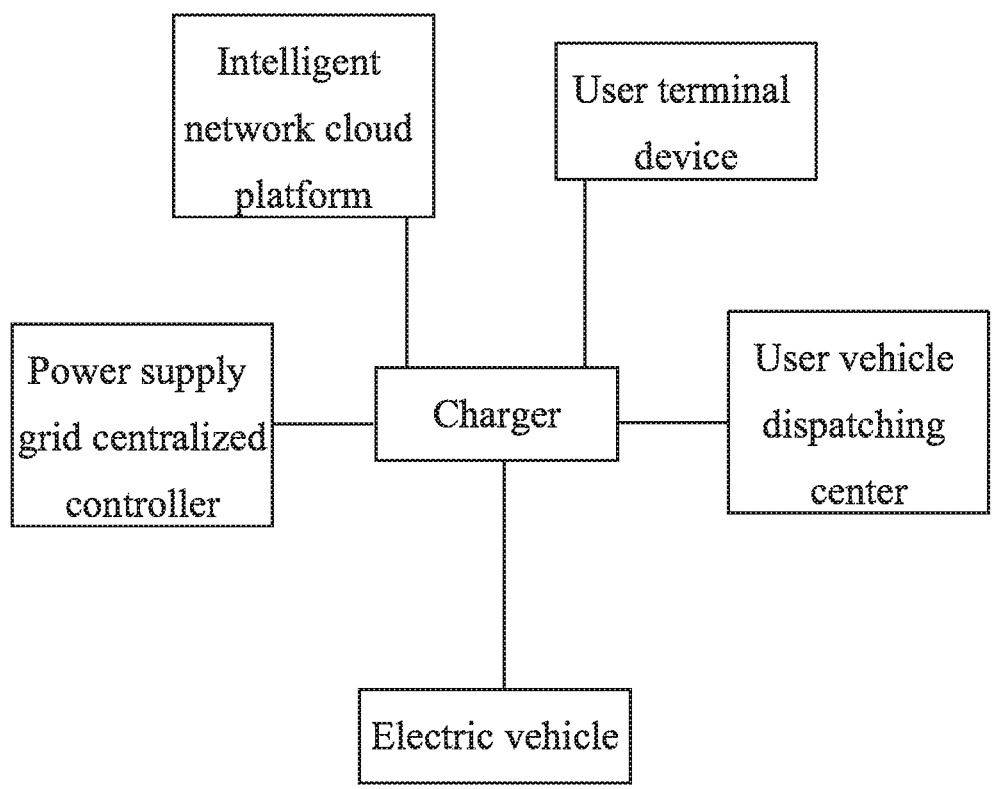
FIG. 1 is a sketch view of a charging management system (CMS) and a charging management method for a charger of an electric vehicle according to a preferred embodiment of the present invention.
Figure 2:
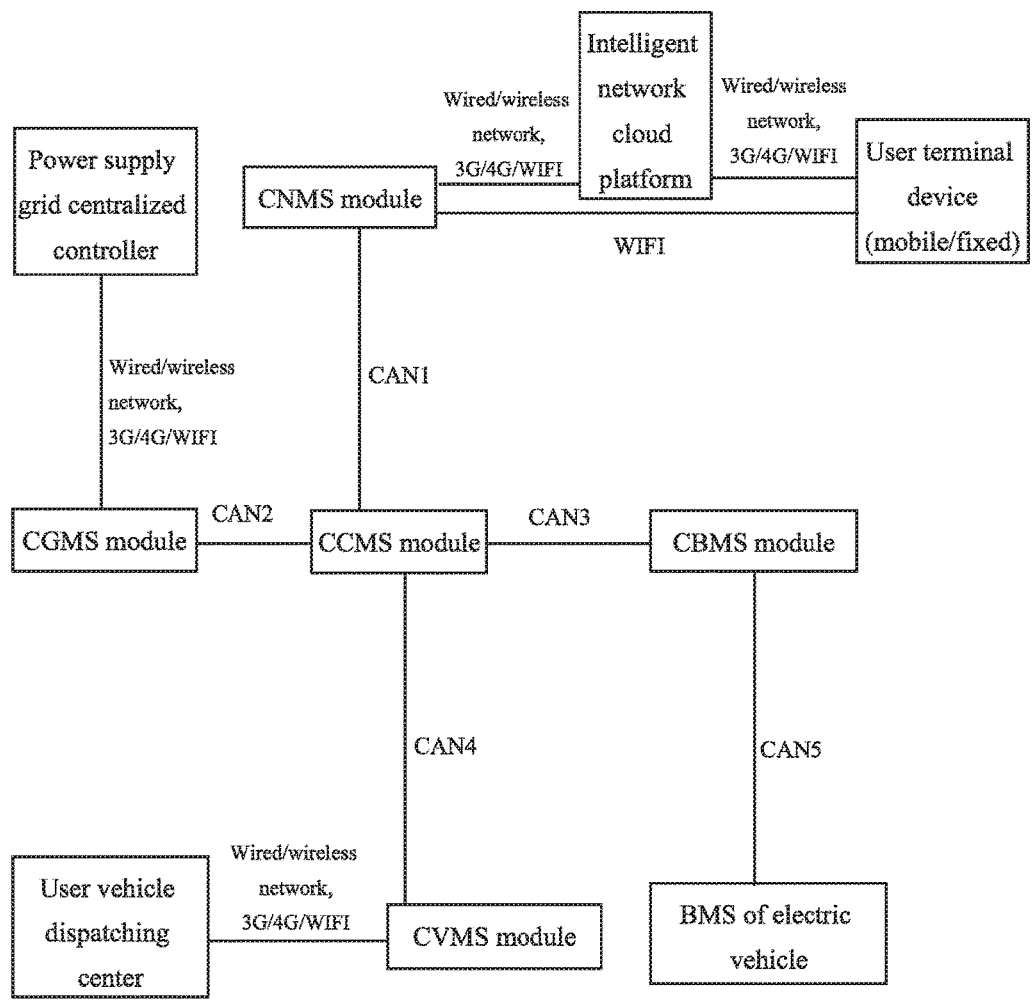
FIG. 2 is a block diagram of principles of the CMS and the charging management method for the charger of the electric vehicle according to the preferred embodiment of the present invention.
Figure 3:
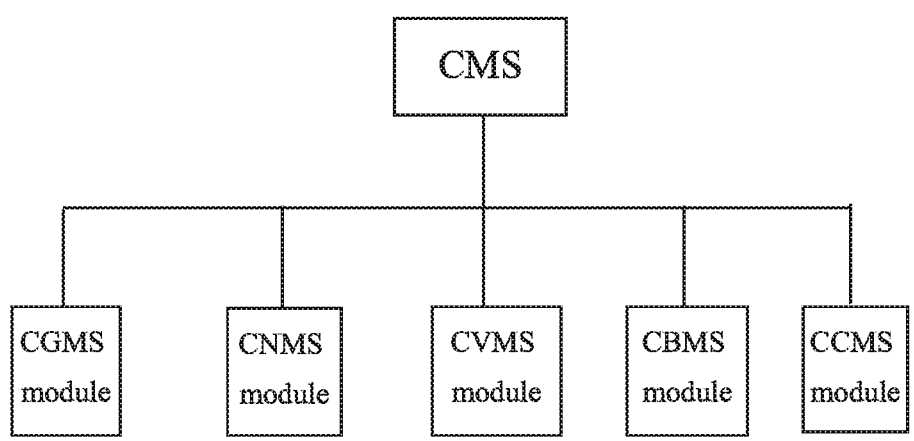
FIG. 3 is a block diagram of a system control of the CMS and the charging management method for the charger of the electric vehicle according to the preferred embodiment of the present invention.

As showed in FIGS. 1-3, according to the preferred embodiment of the present invention, a charging management system (CMS) for a charger of an electric vehicle comprises:

(1) a charger grid micro-dispatching system (CGMS) module, which is responsible for communicating with a power supply grid centralized controller, interpreting received parameter information according to a certain strategy, outputting an interpretation result, and sending the interpretation result to a charger charging management system (CCMS) module;

(2) a charger battery management system (CBMS) module, which is responsible for communicating with a battery management system (BMS) of the electric vehicle, receiving various communication and charging parameters sent by the BMS, interpreting the various communication and charging parameters according to a certain strategy, outputting charging requirement parameters and sending the charging requirement parameters to the CCMS module;

(3) a charger vehicle-dispatching management system (CVMS) module, which is responsible for communicating with the CCMS module through CAN4 and collecting multiple built-in parameters of the charger, and meanwhile responsible for communicating with a user vehicle dispatching center and sending the multiple built-in parameters of the charger to the user vehicle dispatching center;

(4) a charger network management system (CNMS) module, which is responsible for communicating with an intelligent network cloud platform, receiving and sending multiple parameter information, and meanwhile indirectly communicating with a user terminal device through the cloud platform; and (5) the CCMS module, which is a core of the CMS, responsible for communicating with the CGMS module, the CBMS module, the CVMS module, and the CNMS module, and meanwhile responsible for a control of a direct current (DC) module, a control of a vehicle power distribution unit (PDU), battery diagnosis and protection, charger self-diagnosis and self-protection, BMS diagnosis and protection, vehicle diagnosis and protection, and fault recording.

A charging management method for the charger of the electric vehicle is described as follows.

1. Communication between the power supply grid centralized controller and the CGMS module The power supply grid centralized controller monitors grid usage conditions of a controlled area and sends area electric quantity load information to the CMS through 3G/4G/WIFI of a wired/wireless network. The CGMS module receives the area electric quantity load information, judges whether a current area electric quantity is over a preset area electric quantity upper limit, and sends the current area electric quantity and a judged result to the CCMS module through CAN2 showed in FIG. 2.

(1) When the received area electric quantity is high, for example Mkw, which is larger than 120% of the preset upper limit of Nkw, the CGMS module determines not to charge the electric vehicle in a specific time period (for example, in half an hour), and meanwhile sends charging mode information (namely, not charging in half an hour) to the CCMS module.

(2) When the received area electric quantity is relatively high, for example Lkw, which is larger than the preset upper limit of Nkw, but smaller than 120% of the preset upper limit of Nkw, the CGMS module determines to continue charging the electric vehicle, but decreases a charging power required by the BMS to 90% (example only), and meanwhile sends the charging mode information (namely, charging with 90% of the charging power) to the CCMS module.

(3) When the received area electric quantity is not high, for example Pkw, which is smaller than the preset upper limit of Nkw, the CGMS module determines to continue charging the electric vehicle with 100% of the charging power according to requirements of the BMS, and meanwhile sends the charging mode information (namely, charging with 100% of the charging power) to the CCMS module.

The CCMS module receives the charging mode information and starts to charge the electric vehicle according to the received charging mode information.

After finishing charging, the CCMS module sends a charging electric quantity to the CGMS module through the CAN2; the CGMS module collects the charging electric quantity of the charger in a specific time period (for example, in one day), and sends to the power supply grid centralized controller through the 3G/4G/WIFI of the wired/wireless network, for an easier centralized control of charging electric quantity information.

2. Communication between the user vehicle dispatching center and the CVMS module The CVMS module, through the 3G/4G/WIFI of the wired/wireless network, sends a charger location, a charger type, a charger idle condition, the charging power, a condition whether an area electricity consumption is over load parameters, an estimated waiting time, an estimated charging time, and an estimated charging expense to the user vehicle dispatching center, such as a bus dispatching station and a taxi dispatching station. According to the above information, the user vehicle dispatching center determines an affiliated unit of the electric vehicle to choose chargers at different locations for charging the electric vehicle, so as to most effectively utilize resources.

3. Communication between the BMS of the electric vehicle and the CBMS module

A user plugs a charging gun into the electric vehicle; after passing an insulation test, the BMS sends required charging voltage and current of the electric vehicle to the CBMS module through CAN5 showed in FIG. 2; the CBMS module sends the required charging voltage and current to the CCMS module through CAN3. According to requirements, the CCMS module outputs a specific charging power according to a specific charging strategy (referring to the CCMS module). During charging, the BMS sends real-time parameters values, such as a cell maximum voltage, a cell current, and a cell maximum temperature, to the CBMS module through the CAN5. According to multiple built-in parameter thresholds, the CBMS module adjusts an algorithm and sends parameter values of an optimal strategy to the CCMS module. The CCMS module judges the parameter values and appropriately adjusts an output power.

4. Communication between the intelligent network cloud platform and the CNMS module (1) The CNMS module is connected with the CCMS module through CAN1.

(2) When the electric vehicle of the user is connected with the charging gun, the user sends a charging request through the user terminal device; a background of the cloud platform judges the charging request; when charging is feasible, the cloud platform sends a charging starting instruction to the CNMS module through the 3G/4G/WIFI of the wired/wireless network; after receiving the charging starting instruction, the CNMS module sends the charging starting instruction to the CCMS module through the CAN1, so as to finish the charging request.

(3) The CCMS module sends the charger location, the charger type, the charger idle condition, the charging power, charging waiting time, the estimated charging time, and the estimated charging expense to the user terminal device through the CNMS module.

5. The CCMS module is the core of the CMS and responsible for connecting and communicating with the CGMS module, the CBMS module, the CNMS module and the CVMS module.

(1) Intelligent Charging

An intelligent charging strategy is adjusted according to following parameters: area grid load parameters sent by the CGMS module, the required charging voltage and current of the charger sent by the CBMS module, multiple parameters of the cloud platform and related parameters of user charging requirements sent by the CNMS module. Multiple parameter values, which are built in the charger, comprise a preset voltage-time flexible charging curve. During charging, according to collected real-time voltage information, the CCMS module adjusts an output; and meanwhile, according to the different charging requirements (such as a state of charge (SOC) of the electric vehicle of the user, and a required charging time) of the multiple users in the same charging station, the CCMS module appropriately adjusts the output power.

(2) Active Protection

An active protection strategy is adjusted according to following parameters: a total voltage, a cell voltage, a cell maximum voltage, and a cell maximum temperature sent by the CBMS module during charging; meanwhile, based on built-in warning parameter values in the charger, the above parameters are set not to over a specific value; when the above parameters is over the specific value, the CCMS module warns, and even stops charging.

The CMS and the charging management method for the charger of the electric vehicle, provided by the present invention, solve the following problems in prior arts.

1. Non-Intelligent Charger

A charging mode is fixed and single, and the charging strategies are few, which fails to meet requirements of the user; because of lacking dispatching of a micro-grid, the charging power merely considers the requirements of the BMS, and charges the battery with a maximum capacity all the time, which greatly impacts the grid; and meanwhile, related technology of user vehicle dispatching is lacking.

2. If the charger charges the electric vehicle completely according to the requirements of the BMS of the electric vehicle, various unexpected conditions during charging are inevitable. For example, when the BMS crashes, continuous charging of the charger causes over charging and serious consequences.

3. If the charger charges the electric vehicle completely according to the requirements of the BMS, under DC charging, battery life decreases fast. Under current technology, a frequent use of the DC charging increases damages to the battery and shortens the battery life.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A charging management system (CMS) for a charger of an electric vehicle, comprising:

a charger grid micro-dispatching system (CGMS) module, which is responsible for communicating with a power supply grid centralized controller, interpreting received parameter information data according to a certain strategy, outputting an interpretation result, and sending said interpretation result to a charger charging management system (CCMS) module;

a charger battery management system (CBMS) module, which is responsible for communicating with a battery management system (BMS) of the electric vehicle, receiving various communication and charging parameters sent by the BMS, interpreting the various communication and charging parameters according to a certain strategy, outputting charging requirement parameters and sending said charging requirement parameters to said CCMS module;

a charger vehicle-dispatching management system (CVMS) module, which is responsible for communicating with said CCMS module and collecting multiple built-in parameters of the charger, and meanwhile responsible for communicating with a user vehicle dispatching center and sending the multiple built-in parameters of the charger to the user vehicle dispatching center;

a charger network management system (CNMS) module, which is responsible for communicating with an intelligent network cloud platform, receiving and sending multiple parameter information, and meanwhile indirectly communicating with a user terminal device through the cloud platform; and said CCMS module, which is a core of the CMS, responsible for communicating with said CGMS module, said CBMS module, said CVMS module, and said CNMS module, and meanwhile responsible for a control of a direct current (DC) module, a control of a vehicle power distribution unit (PDU), battery diagnosis and protection, charger self-diagnosis and self-protection, BMS diagnosis and protection, vehicle diagnosis and protection, and fault recording.

2. A charging management method for a charger of an electric vehicle, based on the CMS as recited in claim 1, comprising steps of:

before charging, the power supply grid centralized controller monitoring grid usage conditions of a controlled area and sending area electric quantity load information to the CMS; the CGMS module receiving the area electric quantity load information, judging whether a current area electric quantity is over a preset area electric quantity upper limit, and sending the current area electric quantity and a judged result to the CCMS module;

the CCMS module receiving charging mode information and starting to charge the electric vehicle; and after finishing charging, the CCMS module sending a charging electric quantity to the CGMS module; the CGMS module collecting the charging electric quantity of the charger in a specific time period and sending to the power supply grid centralized controller.

3. The charging management method for the charger of the electric vehicle, as recited in claim 2, wherein: during charging, the CVMS module sends current charger information, a condition whether an area electricity consumption is over load parameters, and estimated charging information to the user vehicle dispatching center; and, according to the above information, the user vehicle dispatching center determines an affiliated unit of the electric vehicle to choose chargers at different locations for charging the electric vehicle.

4. The charging management method for the charger of the electric vehicle, as recited in claim 3, wherein: when the electric vehicle of a user is connected with a charging gun, the user sends a charging request through the user terminal device; a background of the cloud platform judges the charging request; when charging is feasible, the cloud platform sends a charging starting instruction to the CNMS module; after receiving the charging starting instruction, the CNMS module sends the charging starting instruction to the CCMS module, so as to finish the charging request; the CCMS module sends the current charger information, the condition whether the area electricity consumption is over the load parameters, and the estimated charging information to the user terminal device through the CNMS module.

5. The charging management method for the charger of the electric vehicle, as recited in claim 3, wherein: the current charger information comprises a charger location, a charger type, a charger idle condition, a charging power, and a charging waiting time; the estimated charging information comprises an estimated charging time and an estimated charging expense.

6. The charging management method for the charger of the electric vehicle, as recited in claim 4, wherein: the current charger information comprises a charger location, a charger type, a charger idle condition, a charging power, and a charging waiting time; the estimated charging information comprises an estimated charging time and an estimated charging expense.

7. The charging management method for the charger of the electric vehicle, as recited in claim 2, wherein: during charging, the BMS sends real-time parameters values, comprising a battery cell maximum voltage, a cell current, and a cell maximum temperature, to the CBMS module; according to multiple built-in parameter thresholds, the CBMS module adjusts an algorithm and sends parameter values of an optimal strategy to the CCMS module; the CCMS module judges the parameter values and appropriately adjusts an output power.

8. The charging management method for the charger of the electric vehicle, as recited in claim 2, wherein: the power supply grid centralized controller monitors the grid usage conditions of the controlled area; wherein:

(1) when the received area electric quantity is Mkw, larger than 120% of the preset upper limit of Nkw, the CGMS module determines not to charge the electric vehicle in a specific time period, and meanwhile sends the charging mode information to the CCMS module;

(2) when the received area electric quantity is Lkw, larger than the preset upper limit of Nkw, but smaller than 120% of the preset upper limit of Nkw, the CGMS module determines to continue charging the electric vehicle, but decreases a charging power required by the BMS to 90%, and meanwhile sends the charging mode information to the CCMS module; and (3) when the received area electric quantity is Pkw, smaller than the preset upper limit of Nkw, the CGMS module determines to continue charging the electric vehicle with 100% of the charging power according to requirements of the BMS, and meanwhile sends the charging mode information to the CCMS module.

9. The charging management method for the charger of the electric vehicle, as recited in claim 2, wherein: an intelligent charging strategy is adjusted according to following parameters: area grid load parameters sent by the CGMS module, required charging voltage and current of the charger sent by the CBMS module, multiple parameters of the cloud platform and related parameters of user charging requirements sent by the CNMS module; multiple parameter values, which are built in the charger, comprise a preset voltage-time flexible charging curve; during charging, according to collected real-time voltage information, the CCMS module adjusts an output; and meanwhile, according to the different charging requirements of the multiple users in the same charging station, the CCMS module appropriately adjusts output power.

10. The charging management method for the charger of the electric vehicle, as recited in claim 2, wherein: an active protection strategy is adjusted according to following parameters: a total voltage, a cell voltage, a cell maximum voltage, and a cell maximum temperature sent by the CBMS module during charging; meanwhile, based on built-in warning parameter values in the charger, the above parameters is set not to over a specific value; when the above parameters is over the specific value, the CCMS module warns, and even stops charging.

* * * * *